United States Patent
Barrett et al.

(10) Patent No.: US 9,386,136 B2
(45) Date of Patent: Jul. 5, 2016

(54) AUTOMATIC DEVICE INITIALIZATION AND PAIRING

(71) Applicant: CLOUDCAR, INC., Los Altos, CA (US)

(72) Inventors: Peter Barrett, Palo Alto, CA (US); Bruce Leak, Los Altos Hills, CA (US); Konstantin Othmer, Los Altos, CA (US); Zarko Draganic, Belvedere, CA (US)

(73) Assignee: CLOUDCAR, INC., East Palo Alto, CA (US)

( * ) Notice: Subject to any disclaimer, the term of this patent is extended or adjusted under 35 U.S.C. 154(b) by 66 days.

(21) Appl. No.: 13/735,914

(22) Filed: Jan. 7, 2013

(65) Prior Publication Data

US 2014/0194056 A1    Jul. 10, 2014

(51) Int. Cl.
*H04B 5/00* (2006.01)
*H04M 1/60* (2006.01)

(52) U.S. Cl.
CPC ........ *H04M 1/6091* (2013.01); *H04M 2250/02* (2013.01); *H04M 2250/06* (2013.01)

(58) Field of Classification Search
CPC .................................................... H04M 1/6091
See application file for complete search history.

(56) References Cited

U.S. PATENT DOCUMENTS

| | | | |
|---|---|---|---|
| 2005/0130625 A1* | 6/2005 | Chong | H04M 15/00 455/406 |
| 2005/0130627 A1* | 6/2005 | Calmels et al. | 455/411 |
| 2007/0238475 A1* | 10/2007 | Goedken | H04M 1/7253 455/512 |
| 2008/0160956 A1* | 7/2008 | Jackson | H04M 3/02 455/406 |
| 2008/0215594 A1* | 9/2008 | Kamei | G06F 17/30023 |
| 2010/0190436 A1* | 7/2010 | Cook | H04B 5/00 455/41.1 |
| 2011/0112969 A1* | 5/2011 | Zaid | G06Q 10/02 705/50 |
| 2013/0013414 A1* | 1/2013 | Haff | G06Q 30/0241 705/14.64 |
| 2013/0203339 A1* | 8/2013 | Smereka | H04H 20/106 455/3.06 |

* cited by examiner

*Primary Examiner* — Edward Urban
*Assistant Examiner* — Mohammed Rachedine
(74) *Attorney, Agent, or Firm* — Maschoff Brennan (57) ABSTRACT

An example embodiment includes an automatic pairing system. The automatic pairing system includes a vehicle initialization module, a vehicle pairing module, and a triggering mechanism. The vehicle initialization module is loaded onto a vehicle abstraction device configured to interface with a vehicle. The vehicle pairing module is loaded on the vehicle abstraction device. The vehicle pairing module is configured to be launched by the vehicle initialization module. After being launched, the vehicle pairing module is configured to automatically communicate vehicle pairing data stored on the vehicle pairing module to establish one or more communication channels between the vehicle and a mobile device. The triggering mechanism is configured to trigger the vehicle initialization module to launch the vehicle pairing module.

17 Claims, 7 Drawing Sheets

AUTOMATIC DEVICE INITIALIZATION AND PAIRING

BACKGROUND

1. Field

The embodiments discussed herein relate to device pairing. More particularly, some example embodiments relate to automated device pairing of consumer mobile devices to automobiles.

2. Relevant Technology

When an operator wishes two or more devices to communicate, usually the devices must be paired. The term "paired" or "pairing" generally refers to linking the devices to enable communication between them. An example of device pairing occurs when an operator establishes a Bluetooth communication channel between a mobile phone and an automobile. A typical device pairing process includes the operator positioning the mobile phone close to a radio or receiver in the automobile. The operator enables Bluetooth capabilities on the mobile phone and the automobile. For example, the operator may activate a receiver in the automobile by pressing a specific button. The automobile and/or the mobile phone are then placed in "pairing" mode. The operator prompts the mobile phone or the automobile to communicate an initial signal between the mobile phone and the automobile. Then, to verify characteristics of the mobile phone and/or the automobile, the operator inputs a pass code. After the pass code has been input, the receiver and the mobile phone begin sharing settings, communication format information, data rate information, etc. such that the mobile phone may wirelessly access devices such as a speaker system and a microphone of the automobile to make handsfree telephone calls.

The above device pairing process can be cumbersome. Most people have trouble completing the steps successfully without assistance. Often the operator needs dealer assistance or some kind of technical support. In addition, the above device pairing process varies considerably based on the model of automobile and the model of mobile phone, and often does not work at all because of incompatibilities between the automobile and the mobile phone and/or because of user error.

Additionally, the Bluetooth communication channel between the mobile phone and the automobile is typically used for a speakerphone function (e.g., making, answering, and conducting handsfree telephone calls, etc.). Thus, the hassle the operator endures to establish the Bluetooth communication channel provides limited functionality between the mobile phone and the automobile.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary introduces a selection of concepts in a simplified form that are further described below. This Summary is not intended to identify key features or essential characteristics of the claimed subject matter, nor is it intended to be used as an aid in determining the scope of the claimed subject matter.

An example embodiment includes an automatic pairing system. The automatic pairing system generally reduces or eliminates manual input from an operator to pair devices. The automatic pairing system further reduces or eliminates ambiguity when two or more paired devices are present. Additionally, the automatic pairing system automatically establishes multiple communication channels between the devices such that multiple formats of data can be communicated between the devices.

One specific example pairs a mobile device with a vehicle. The vehicle can be fit with or otherwise include a vehicle abstraction device in some embodiments. However, the vehicle abstraction device, or functions attributed thereto, may be integrated into one or more systems of the vehicle, such as a built-in Bluetooth speakerphone. The automatic pairing system includes a mobile device initialization module and a mobile device pairing module, which are loaded onto the mobile device. Additionally, the automatic pairing system includes a vehicle initialization module and a vehicle pairing module, which are loaded onto the vehicle abstraction device. The automatic pairing system also includes a triggering mechanism.

The mobile device pairing module is configured to be launched by the mobile device initialization module. Likewise, the vehicle pairing module is configured to be launched by the vehicle initialization module. After being launched, the vehicle pairing module is configured to communicate with the mobile device pairing module to establish one or more communication channels between the mobile device and the vehicle.

The triggering mechanism is configured to trigger the mobile device initialization module and vehicle initialization module to launch the mobile device pairing module and the vehicle pairing module, respectively. An example of the triggering mechanism includes a near field communication (hereinafter "NFC") subsystem. The NFC subsystem includes an NFC receiver integrated into the mobile device and an NFC tag secured to a component of the vehicle such as a dashboard or center console. By positioning the mobile device within a predefined distance of the NFC tag, the system can be triggered. Alternatively, the triggering mechanism can be a pluggable cable. Some example pluggable cables include, but are not limited to, a universal serial bus (USB) cable, a mobile high-definition link (MHL) cable, high-definition multimedia interface (HDMI) cable, or the like. When the pluggable cable is plugged into the mobile device and a vehicle connector, the automatic pairing system is triggered. Alternatively, the triggering mechanism can be a unique WiFi hotspot hosted by the vehicle or the mobile device. When the unique hotspot is detected, the automatic pairing system is triggered.

The operator does not have to input pass codes or scroll through menus, etc. to carry out the pairing process. Instead, the action of the operator is limited to triggering the automatic pairing system. The system then launches the pairing software that initiates the protocols described herein between the mobile device and the vehicle to establish one or more communication channels between the devices.

Another example embodiment includes a method of pairing a mobile device with a vehicle abstraction device. The vehicle abstraction device is configured to interface with a vehicle. The method includes triggering a mobile device initialization module loaded on the mobile device. The mobile device initialization module is configured to launch a mobile device pairing module. The method also includes automatically sharing mobile device pairing data stored on the mobile device pairing module with the vehicle. The mobile device pairing data is configured to establish at least one communication channel between the mobile device and the vehicle abstraction device.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

Embodiments will be described and explained with additional specificity and detail through the use of the accompanying drawings in which.

DESCRIPTION OF SOME EXAMPLE EMBODIMENTS

Some example embodiments discussed herein relate to automatically pairing devices to establish communication between the devices with limited manual input from an operator. One example embodiment includes an automatic pairing system that enables an operator or operators to automatically pair one or more mobile devices with a vehicle. Each of the mobile devices is independently paired with the vehicle with limited action by the operator. In particular, to pair each mobile device, the operator triggers a mobile device initialization module and a vehicle initialization module. The mobile device initialization module and a vehicle initialization module launch a mobile device pairing module and a vehicle pairing module that share pairing data. When multiple mobile devices are paired with the vehicle, the automatic pairing system also limits or prioritizes which of the mobile devices communicates with the vehicle at any time.

Reference will now be made to the figures wherein like structures will be provided with like reference designations. The drawings are diagrammatic and schematic representations of example embodiments and, accordingly, are not limiting of the scope of the claimed subject matter, nor are the drawings necessarily drawn to scale.

Figure 1:
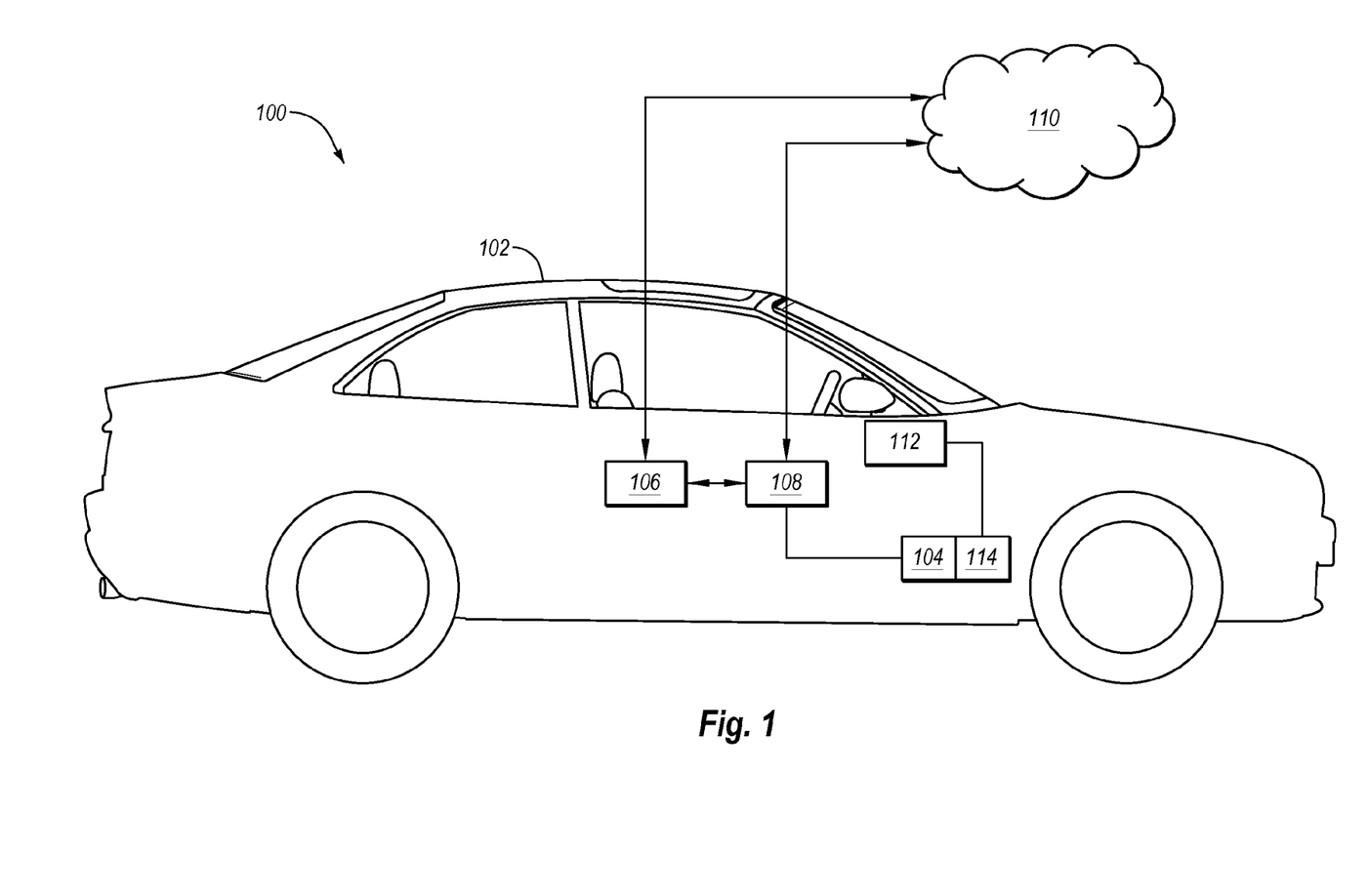
FIG. 1 illustrates an example operating environment in which some embodiments described herein may be implemented.

FIG. 1 illustrates an example operating environment 100 in which some embodiments described herein may be implemented. The operating environment 100 includes a vehicle 102 into which an abstraction device 108 has been installed. The abstraction device 108 can be a unit that is retrofit to the vehicle 102 by an operator. Alternatively, the abstraction device 108 can be included in a head unit and/or programmed into from-the-factory software included in a radio, a navigation system, or one or more other vehicle components 112.

Although illustrated as an automobile, this depiction of the vehicle 102 is not meant to be limiting. Specifically, the vehicle 102 may include, but is not limited to, a car, a truck, a motorcycle, a tractor, an airplane, a boat, etc. Additionally, the operating environment 100 including the vehicle 102 only represents one example in which embodiments disclosed herein may be implemented. For example, alternative operating environments can include a machine, medical equipment, industrial equipment, for instance, in which the abstraction device 108 is installed.

When installed, the abstraction device 108 is configured to communicate with one or more mobile devices 106 and one or more of the vehicle components 112. The mobile device 106 depicted in FIG. 1 is positioned within the vehicle 102, but represents an independent mobile device such as a consumer mobile phone, tablet personal computer, smart phone, etc. and not a component included in the vehicle 102.

To communicate with the vehicle components 112, the abstraction device 108 includes an adaptor 104 configured to interface with one or more Controller Area Network (hereinafter "CAN") buses 114. The CAN bus 114 connects to the vehicle components 112 such that operational states of the vehicle components 112 can be received, monitored, and/or modified. The CAN bus 114 can alternatively or additionally include any bus used in a vehicle 102 for communicating signals between components, including other standards like media oriented systems transport (MOST), local interconnect network (LIN), Inter-Integrated Circuit (I2C), and Ethernet. In operation, the abstraction device 108 relays vehicle data between the vehicle 102 and the mobile device 106 via one or more communication channels.

In a particular application, the communication channels may include video, audio, or other data projection communication channels, a remote procedure call (hereinafter "RPC") communication channel, a general purpose data communication channel, a Bluetooth communication channel, a wireless or physical cabled communication channel, or any combination thereof.

For example, the vehicle components 112 can include a global positioning system (hereinafter "GPS") receiver and/or a speed sensor. Accordingly, the related operational states can be a position and a time sensed by the GPS receiver and/or a speed of the vehicle 102 sensed by the speed sensor. As the vehicle 102 operates, the position, the time, and the speed are communicated to the CAN bus 114. The abstraction device 108 abstracts the position, the time, and the speed using the adaptor 104 and communicates the position, the time, and the speed to the mobile device 106. The position, the time, and the speed can be communicated to the mobile device 106 via a WiFi or Bluetooth communication channel, for instance. The mobile device 106 and/or another device, which is accessed via the communication network 110, can have a mobile navigation application configured to receive and/or use the position, the time, and the speed. The mobile navigation application can communicate a set-up feature to the abstraction device 108 via the RPC communication channel, which enables the mobile navigation application to interface with the vehicle 102. The mobile device 106 can transmit information to the abstraction device 108 for display in the vehicle 102. The information may be communicated to the abstraction device 108 via a WiFi or Bluetooth channel, for example, to be displayed or projected to a head unit in the vehicle's dashboard. The real-time display may be communicated via the data projection communication channel. At any time, information may be communicated on one or more of the communication channels. Additionally, the information communicated via each communication channel may differ in rate, format, etc.

The vehicle 102, the abstraction device 108, the vehicle components 112, the mobile device 106, and/or communication between them can occur substantially as disclosed in U.S. patent application Ser. No. 13/664,212, entitled "AUTO-MOBILE DATA ABSTRACTION AND COMMUNICATION" and filed Oct. 30, 2012, which is incorporated herein by reference in its entirety.

In some embodiments, projection of content communicated between the vehicle 102, the abstraction device 108, the vehicle components 112, and/or the mobile device 106 can occur substantially as disclosed in U.S. patent application Ser. No. 13/664,204, entitled "PROJECTION OF CONTENT TO EXTERNAL DISPLAY DEVICES" and filed Oct. 30, 2012, which is incorporated herein by reference in its entirety.

FIGS. 2A-2D illustrate block diagrams of an example automatic pairing system 200 that may be implemented in the operating environment 100 of FIG. 1. Generally, the pairing system 200 automatically initializes software that establishes the communication channels between a mobile device 202 and a vehicle abstraction device 204 and/or other devices in the vehicle 250. The automatic pairing system 200 is generally used the first time the mobile device 202 and the vehicle abstraction device 204 are paired. Additionally, the automatic pairing system 200 can also be used when any other mobile device (not shown) is paired with the vehicle abstraction device 204. Instead of an operator having to physically input a series of pass codes and work through a cumbersome pairing process, the automatic pairing system 200 triggers the mobile device 202 and the vehicle abstraction device 204 to do so with limited or no action by the operator. Thus, the automatic pairing system 200 reduces or eliminates the operator having to manually pair the mobile device 202 with the vehicle abstraction device 204.

The description of FIGS. 2A-2D is directed towards pairing the mobile device 202 and the vehicle abstraction device 204. However, this is not meant to be limiting. The automatic pairing system 200 can be implemented between any two or more devices to establish communication channels therebetween. Additionally, the automatic pairing system 200 can be implemented more generally with a vehicle 250 that includes some or all the functionality discussed herein with reference to the vehicle abstraction device 204.

Figure 2A:
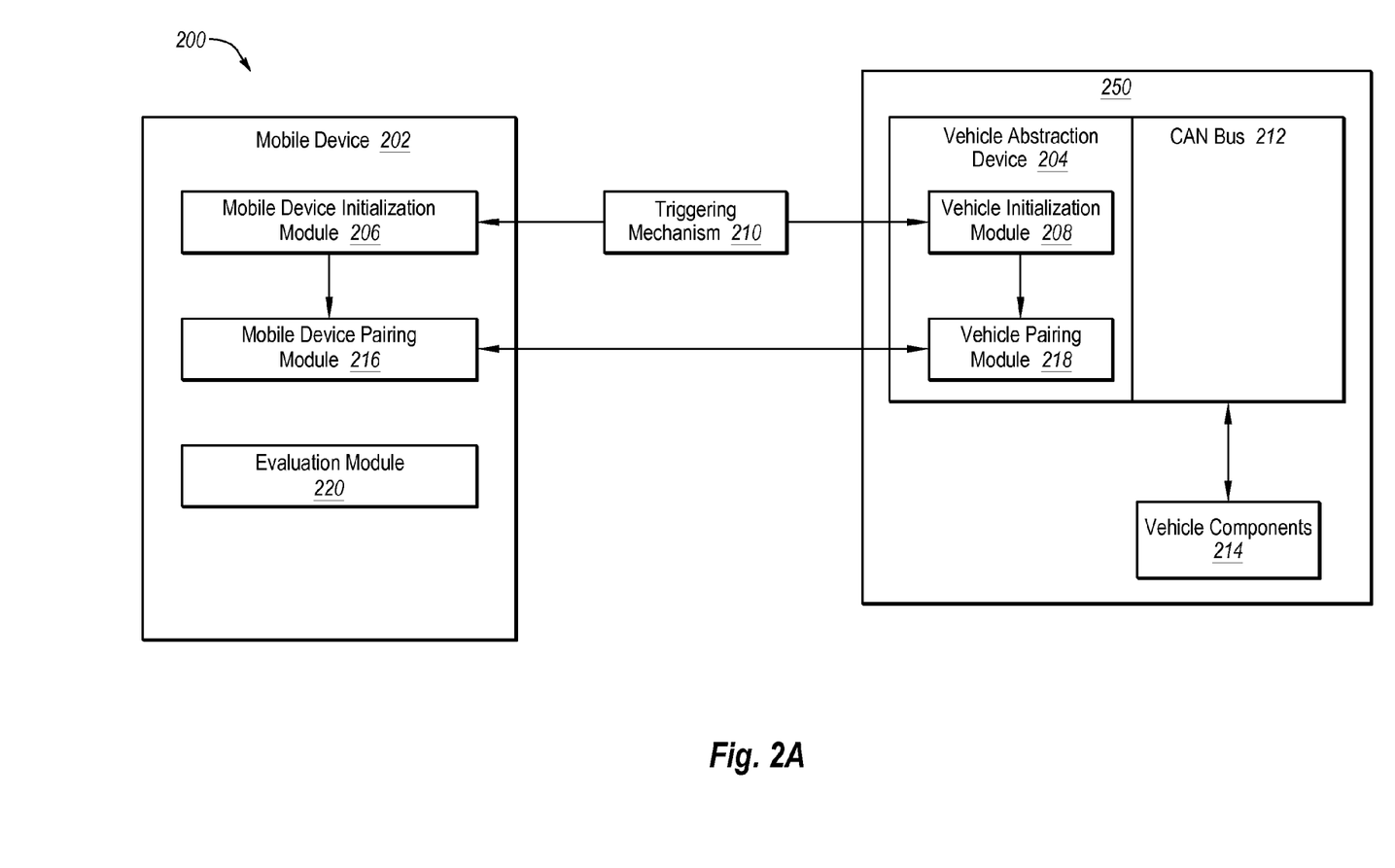
FIGS. 2A-2D are block diagrams of an example automatic pairing system that can be implemented in the operating environment of FIG. 1.

With specific reference to FIG. 2A, a first block diagram is illustrated that depicts a general configuration of the automatic pairing system 200. The automatic pairing system 200 includes a mobile device initialization module 206 loaded onto the mobile device 202 and a vehicle initialization module 208 loaded onto the vehicle abstraction device 204.

The vehicle abstraction device 204 may be substantially similar and/or correspond to the abstraction device 108 discussed with reference to FIG. 1. For example, the vehicle abstraction device 204 is coupled to a CAN bus 212 or other suitable communication bus, which is further coupled to one or more vehicle components 214.

The automatic pairing system 200 also includes a triggering mechanism 210. The triggering mechanism 210 is configured to trigger the mobile device initialization module 206 and/or the vehicle initialization module 208. The triggering mechanism can trigger only the mobile device initialization module 206, which then triggers the vehicle initialization module 208, vice versa, or the triggering mechanism 210 can trigger the mobile device initialization module 206 and the vehicle initialization module 208 substantially simultaneously.

When triggered, the mobile device initialization module 206 is configured to launch the mobile device pairing module 216. The mobile device pairing module 216 is loaded onto the mobile device 202. The mobile device pairing module 216 includes mobile device pairing data. The mobile device pairing data can include, but is not limited to, identifying information for the mobile device 206, passwords, pairing sequence formats, protocols, networking medium, and number and types of communication channels.

Likewise, the vehicle initialization module 208 launches a vehicle pairing module 218 loaded on the vehicle abstraction device 204. The vehicle pairing module 218 includes vehicle pairing data. The vehicle pairing data in the vehicle pairing module 218 may include complementary software to the mobile device pairing data. Executing the mobile device pairing data with the vehicle pairing data enables pairing of the mobile device 202 with the vehicle abstraction device 204 and establishes one or more communication channels therebetween.

After being triggered, the mobile device initialization module 206 and the vehicle initialization module 208 automatically launch the mobile device pairing module 216 and the vehicle pairing module 218, respectively. After the mobile device pairing module 216 and the vehicle pairing module 218 have been launched, sharing of the mobile device pairing data and the vehicle pairing data by the mobile device pairing module 216 and the vehicle pairing module 218 begins. Thus, the communication channels are established between the mobile device 202 and the vehicle abstraction device 204 by simply performing the action of the triggering mechanism 210.

In some embodiments, an evaluation module 220 is included in the mobile device 202. The evaluation module 220 is configured to determine an optimal method of pairing between the mobile device 202 and the vehicle abstraction device 204 and/or other devices in the vehicle 250. For example, the vehicle 250 can have a built-in speakerphone module with limited Bluetooth capabilities. Accordingly, the evaluation module 220 can select not to establish a Bluetooth communication channel between the mobile device 202 and the Bluetooth speakerphone in the vehicle component 214. The optimal method of pairing may be related to system capability, specification of the operator, data rate requirement, etc.

Figure 2B:
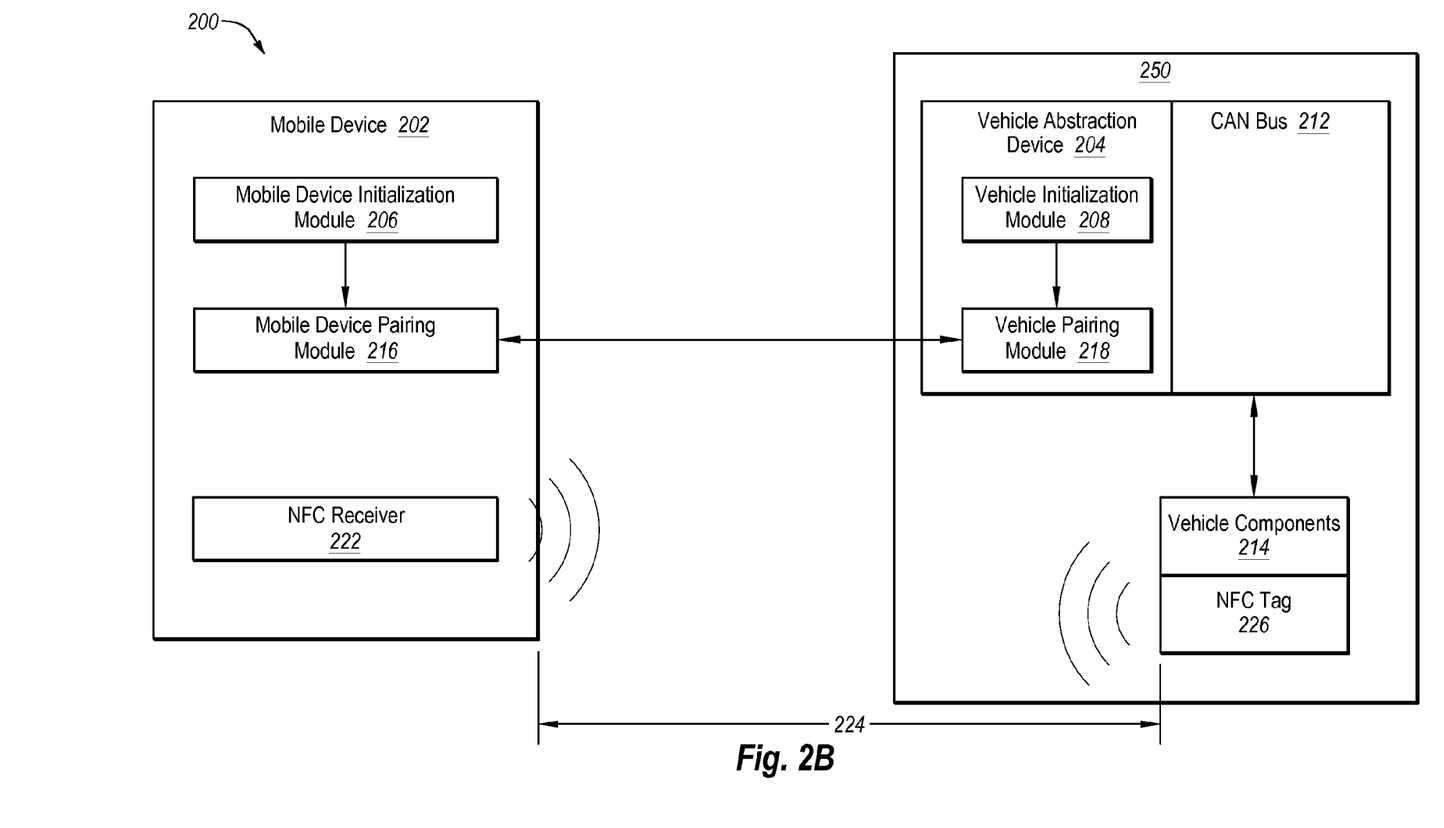

FIG. 2B illustrates some additional details of the automatic pairing system 200 in which a near field communication (hereinafter "NFC") subsystem is implemented for a triggering mechanism (210 of FIG. 2A). Generally, the NFC subsystem enables short-range wireless communication of a small amount (e.g. 96-4096 bits) of data. The NFC subsystem includes an NFC receiver 222 and an NFC tag 226. The NFC receiver 222 is an initiator that can generate a radio frequency field to power the NFC tag 226. The NFC receiver 222 is then communicated date from the NFC tag 226. The NFC receiver 222 is included in the mobile device 202. For example, some mobile phones, tablet computers, etc. come with NFC receivers 222 installed.

Generally, the NFC tag 226 includes an identifying signal sufficient for the mobile device 202 to identify the vehicle abstraction device 204 and to initiate a successful pairing between the mobile device 202 and the vehicle abstraction device 204. For example, the NFC tag 226 can include a specific make or model of the vehicle 250 associated with the vehicle abstraction device 204, identifying information pertaining to versions of pairing data (e.g. the mobile device pairing data or the vehicle pairing data), additional software applications or drivers needed for automatic pairing, or other information that can uniquely identify the vehicle 250 and/or the vehicle abstraction device 204. The identifying signal is communicated to the NFC receiver 222 when the NFC tag 226 is activated. Accordingly, after the NFC tag 226 is activated by the NFC receiver 222, the NFC receiver 222 switches modes to receive the identifying signal included on the NFC tag 226.

The NFC tag 226 can be a sticker, a fob, a card, or software programmed into a device similar to the NFC tag 226, for instance. The NFC tag 226 may be secured to a dashboard or another vehicle component 214 that enables the operator to easily find the NFC tag 226 and enables easy access to the NFC tag 226. The NFC tag 226 can also be an aftermarket NFC tag that is retrofit to the vehicle component 214 for use with the NFC receiver 222.

In the depicted embodiment, the NFC receiver 222 is included in the mobile device 202 and the NFC tag 226 is secured to a vehicle component 214. However, this depiction is not meant to be limiting. The NFC receiver 222 may instead be included in one of the vehicle components 214 and the NFC tag 226 may be secured to the mobile device 202.

When the mobile device 202 is positioned within a predefined distance 224 of the NFC tag 226, the NFC tag 226 is activated which communicates an identifying signal to the NFC receiver 222. The predefined distance 224 is about four centimeters in some embodiments. The NFC receiver 222 then triggers the vehicle initialization module 208 and the mobile device initialization module 206 to launch the mobile device pairing module 216 and the vehicle pairing module 218. Mobile device pairing data and the vehicle pairing data are then shared by the mobile device 202 and the vehicle abstraction device 204 to establish one or more communication channels. The one or more communication channels can include, but are not limited to, video, audio, or other data projection communication channels, a remote procedure call (RPC) communication channel, a general purpose data communication channel, a physical cabled communication channel, a WiFi communication channel, and/or a Bluetooth communication channel.

In effect, by simply positioning the mobile device 202 within the predefined distance 224 of the NFC tag 226, the pairing between the mobile device 202 and the vehicle abstraction device 204 is achieved. The pairing establishes multiple communication channels that can perform various functions. The operator does not have to input various pass codes or work through complicated menus and settings, thus saving the operator time and frustration.

Figure 2C:
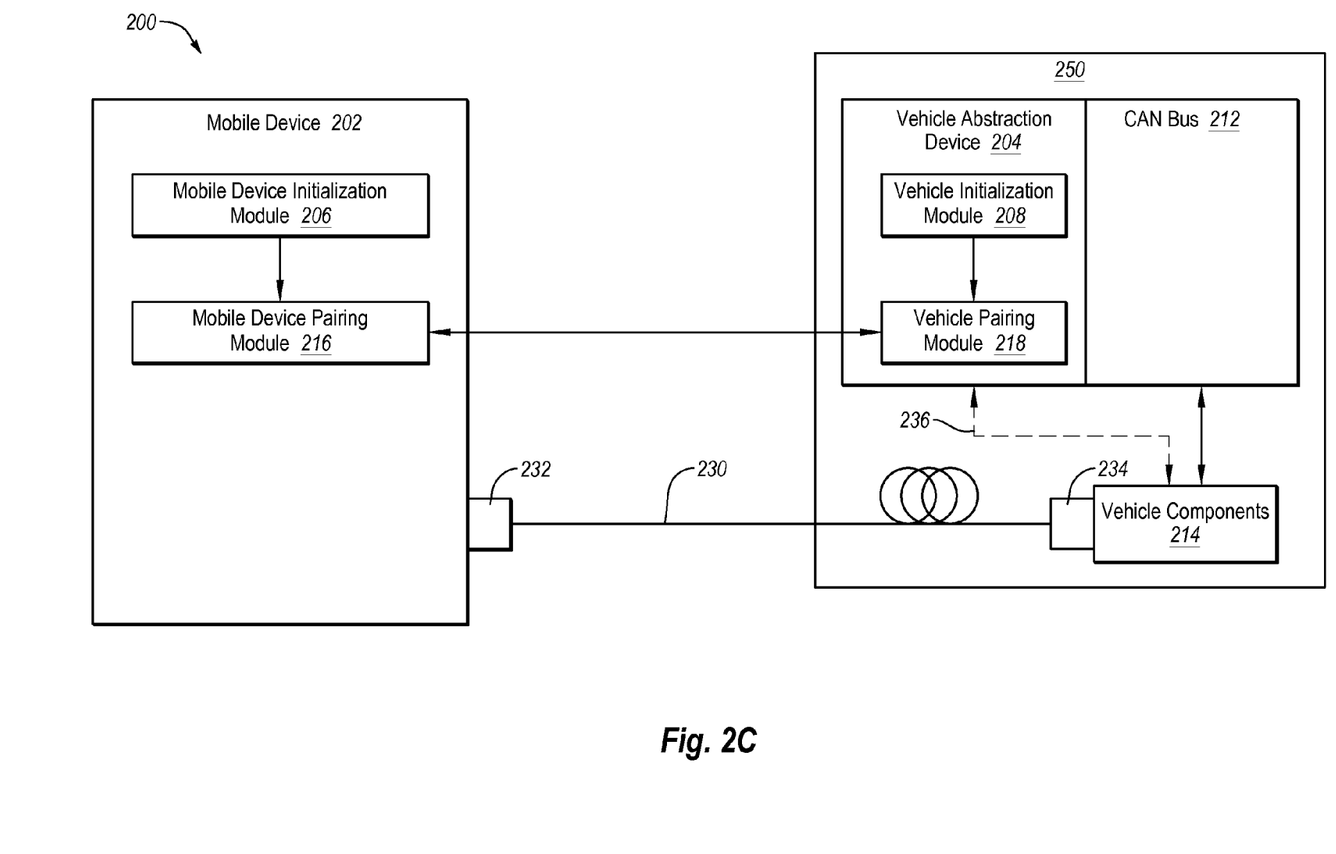

FIG. 2C illustrates some additional details of the automatic pairing system 200 in which a pluggable cable 230 is implemented for a triggering mechanism (210 of FIG. 2A). Generally, the pluggable cable 230 is configured to connect a vehicle connector 234 to a mobile device connector 232. A resulting connection between the vehicle connector 234 and the mobile device connector 232 enables communication of an identifying signal between the vehicle abstraction device 204 and the mobile device 202. After the identifying signal have been communicated, the mobile device initialization module 206 and the vehicle initialization module 208 are triggered, which in turn launch the mobile device pairing module 216 and the vehicle pairing module 218.

The vehicle connector 234 may be one of the vehicle components 214 such as a USB interface, a cigarette lighter, an auxiliary input on a radio, etc. The vehicle connector 234 can be configured to communicate with the vehicle abstraction device 204 directly though a native interface (e.g., a USB interface), or indirectly through the CAN Bus 212 in these embodiments. In FIG. 2C, a dashed arrow labeled 236 represents the alternative configuration with direct communication between the vehicle abstraction device 204 and the vehicle component 214 that includes the vehicle connector 234.

Alternatively, the vehicle connector 234 can be included in the vehicle abstraction device 204.

The mobile device connector 232 can be a charging port or a data synchronization port, for instance. The mobile device connector 232 can communicate with the mobile device initialization module 206 as well as other systems included on the mobile device 202.

Figure 2D:
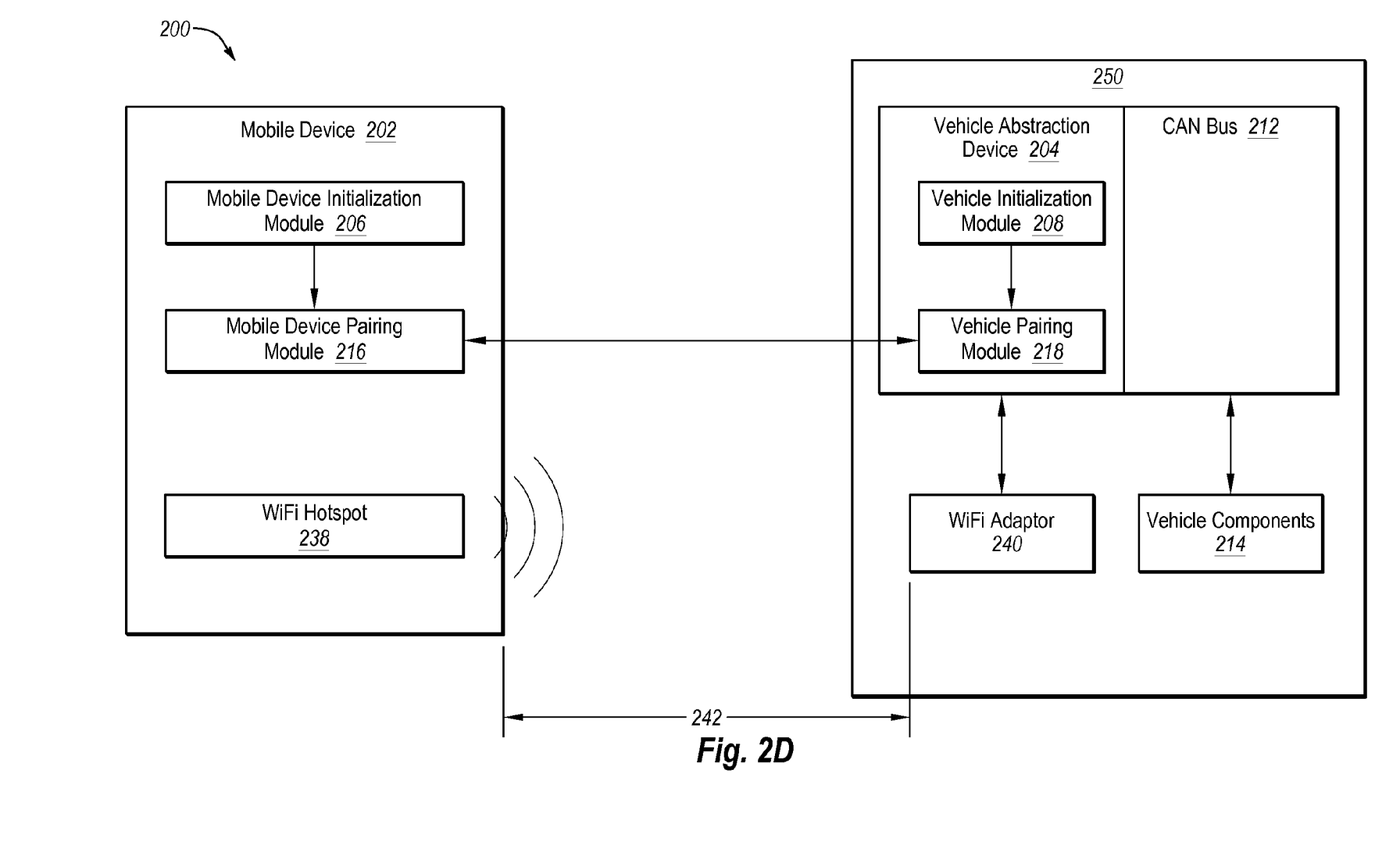

FIG. 2D illustrates some additional details of the automatic pairing system 200 in which a WiFi hotspot 238 and a WiFi adaptor 240 are implemented for a triggering mechanism (210 of FIG. 2A). Generally, the WiFi hotspot 238 provides a wireless Internet connection to one or more devices having a WiFi adaptor such as the WiFi adaptor 240. Thus, the mobile device 202 shares a wireless data connection with the one or more other devices.

The WiFi hotspot 238 provides the wireless Internet connection within a limited range 242. The limited range 242 can be about 10 meters in some embodiments. Generally, inside the limited range 242, the wireless Internet connection provided by the WiFi hotspot 238 can be detected by a device having a WiFi adaptor such as the WiFi adaptor 240. Additionally, the strength of the wireless Internet connection can be detected by the WiFi adaptor. As the WiFi hotspot 238 moves closer to the WiFi adaptor, the strength of the wireless Internet connection increases.

Accordingly, the detection of the wireless Internet connection as well as the detection of the strength of the wireless Internet connection provided by the WiFi adaptor 240 is related to the distance between the mobile device 202 and the vehicle 250. For example, detection of the wireless Internet connection indicates that the mobile device 202 is within the limited range 242 and a strength of the wireless Internet connection can indicate the mobile device 202 is certain distances from the vehicle 250.

The detection of the wireless Internet connection provided by the WiFi hotspot 238 and/or detection of a certain strength of the wireless Internet connection provided by the WiFi hotspot 238 can be used to trigger the mobile device initialization module 206 and the vehicle initialization module 208. For example, when the mobile device 202 including the WiFi hotspot 238 is positioned within the limited range 242 of the vehicle 250 having the WiFi adaptor 240, the wireless Internet connection and/or a strength of the wireless Internet connection is detected by the WiFi adaptor 240. The detection triggers the mobile device initialization module 206 and the vehicle initialization module 208 and the vehicle 250 is paired with the mobile device 202 as discussed above.

As depicted in FIG. 2D, the WiFi hotspot 238 is included in the mobile device 202 and the WiFi adaptor 240 is included in the vehicle 250. However, this depiction is not meant to be limiting. The WiFi hotspot 238 may be included in the mobile device 202, the vehicle abstraction device 204, or a vehicle component 214. Likewise, the WiFi adaptor 240 may also be included in the mobile device 202, the vehicle abstraction device 204, or a vehicle component 214.

Figure 3:
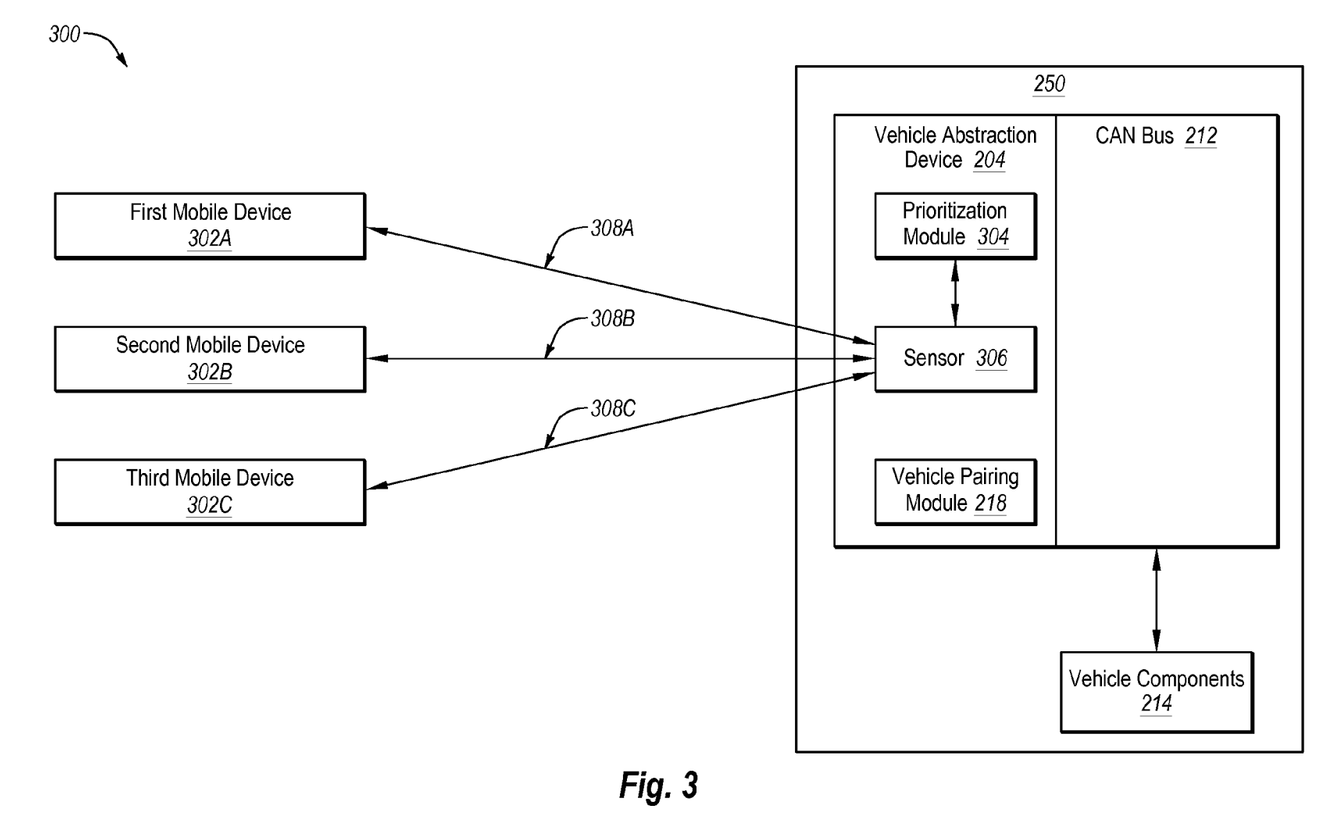
FIG. 3 is a block diagram of another example automatic pairing system that can be implemented in the operating environment of FIG. 1.

FIG. 3 illustrates another example automatic pairing system 300 that may be implemented in the operating environment 100 of FIG. 1. The automatic pairing system 300 includes components (e.g. 204, 218, 214, 250, and 212) described with reference to FIGS. 2A-2D. Some details of the components are not repeated with reference to FIG. 3.

In the automatic pairing system 300, the vehicle pairing module 218 is configured to pair multiple mobile devices 302A-302C (generally, mobile device 302 or mobile devices 302) with the vehicle abstraction device 204. The mobile devices 302 are substantially similar to and can correspond to the mobile device 202 discussed with reference to FIGS.

2A-2D. Each of the mobile devices 302 can be paired with the vehicle abstraction device 204 as described above with reference to FIGS. 2A-2D. In FIG. 3, three mobile devices 302 are depicted. However, this is not meant to be limiting. The automatic pairing system 300 can include fewer than three or more than three mobile devices 302.

The vehicle abstraction device 204 includes a prioritization module 304. The prioritization module 304 is configured to limit communication with the vehicle 250 and/or the vehicle abstraction device 204. Specifically, in some embodiments, communication is limited to communication between a single mobile device 302 and the vehicle abstraction device 204 at any time. To limit communication, the prioritization module 304 inactivates communication channels between the mobile devices 302 and the vehicle abstraction device 204 that are not selected for communication.

The prioritization module 304 may perform the same operations and functions as described above with respect to the vehicle initialization module 208. The prioritization module 304 additionally performs various other operations as described herein. For example, in some embodiments, the prioritization module 304 tracks pairing times in which each of the mobile devices 302 is paired with the vehicle pairing module 218. The prioritization module evaluates which of the mobile devices 302 paired most recently with the vehicle abstraction device 204. The prioritization module 304 then limits communication with the vehicle abstraction device 204 to the mobile device 302 that most recently paired with the vehicle abstraction device 204.

Additionally or alternatively, the prioritization module 304 communicates with a sensor 306. The sensor 306 may be included in the vehicle abstraction device 204 as shown or may be included in one of the vehicle components 214. The sensor 306 is configured to measure the distances 308A-308C between each of the mobile devices 302 and the sensor 306. The distances 308A-308C relate to the distance between the mobile device 302 and the vehicle abstraction device 204. For instance, the sensor 306 can be configured to measure the relative strength of a WiFi signal transmitted by each of the mobile devices 302. The relative strengths of the WiFi signals, in some embodiments, indicate the distances 308A-308C between the mobile devices 302 and the sensor 306.

In these and other embodiments, the prioritization module 304 limits communication to the mobile device 302 nearest the vehicle abstraction device 204. In effect, the prioritization module 304 is limiting communication to the mobile device 302 of a current operator of the vehicle 250, which generally corresponds to the mobile device 302 nearest the sensor 306.

The embodiments of the prioritization module 304 above are illustrative and not meant to be limiting. In alternative embodiments of the prioritization module 304, the mobile devices 302 can be set as a primary, secondary, tertiary, etc., mobile device 302. The primary mobile device 302, when detected, communicates with the vehicle abstraction device 204 regardless of the distance 308 or pairing time. Alternatively still, a first mobile device 302A can be set to communicate on a Bluetooth communication channel while a second mobile device 302B can be set to communicate on an RPC communication channel. Setting the first mobile device 302A to communicate on the Bluetooth communication channel or the second mobile device 302B to communicate on the RPC communication channel can be based on capabilities of the first mobile device 302A or the second mobile device 302B, or programs, data, applications, etc. loaded thereon, or be explicitly selected or overridden by the operator through an operator interface setting.

Figure 4:
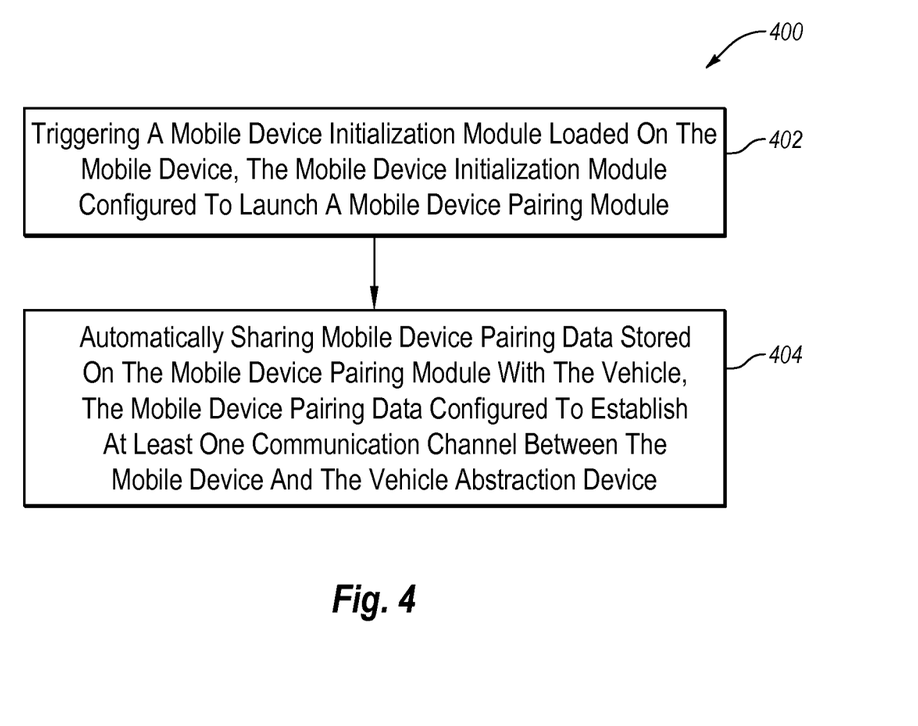
FIG. 4 is a flow chart of an example method of pairing a mobile device with a vehicle abstraction device, arranged in accordance with at least some embodiments described herein.

FIG. 4 is a flow chart of an example method 400 of pairing a mobile device with a vehicle abstraction device, arranged in accordance with at least some embodiments described herein. The method 400 begins at 402 by triggering a mobile device initialization module loaded on the mobile device. The mobile device initialization module is configured to launch a mobile device pairing module. In some embodiments, triggering the mobile device initialization module includes a radio frequency field being generated to power a near field communication (NFC) tag. The NFC tag can be secured to a vehicle component. When the NFC tag is powered, an identifying signal is received from the NFC tag. The NFC tag can come installed on the vehicle component or can be an aftermarket NFC tag retrofit onto the vehicle component. Additionally or alternatively, triggering the mobile device initialization module can include connecting a pluggable cable between the mobile device and the vehicle.

At 404, the method 400 includes automatically sharing mobile device pairing data stored on the mobile device pairing module with the vehicle. The mobile device pairing data is configured to establish at least one communication channel between the mobile device and the vehicle abstraction device. The at least one communication channel can include a data projection communication channel, a remote procedure call (RPC) communication channel, a Bluetooth communication channel, or any combination thereof.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments. For instance, the method 400 may further include determining an optimal method of pairing between the mobile device and the vehicle.

Additionally, the mobile device can be one mobile device of multiple mobile devices that have, at one time or another, been paired with the vehicle abstraction device or that may be paired with the vehicle abstraction device. When there are multiple mobile devices with which the vehicle abstraction device may be paired, the method 400 can include limiting communication to communication between the vehicle abstraction device and one of the mobile devices to the exclusion of the other mobiles devices. For example, limiting communication can include evaluating which of the mobile devices is in closest proximity of the vehicle abstraction device, belongs to the operator, is selected by the operator, or was paired most recently with the vehicle abstraction device and allowing communication between the vehicle abstraction device and the chosen mobile device.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer such as a System-on-chip (SOC). Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An automatic pairing system comprising:
   a vehicle initialization module loaded onto a vehicle abstraction device configured to interface with a vehicle;
   a vehicle pairing module loaded onto the vehicle abstraction device, the vehicle pairing module being configured to be launched by the vehicle initialization module and, after being launched, configured to automatically communicate vehicle pairing data stored on the vehicle pairing module to any of a plurality of mobile devices to establish one or more communication channels of two or more communication types between the vehicle and each of the plurality of mobile devices, wherein the one or more communication channels include two or more or a combination of a data projection communication channel, a remote procedure call (RPC) communication channel, and a Bluetooth communication channel;
   a triggering mechanism configured to trigger the vehicle initialization module to launch the vehicle pairing module; and
   a prioritization module that is configured to set a first communication channel of a first communication channel type between the vehicle and a first of the plurality of mobile devices while setting a second communication channel of a second communication type between the vehicle and a second of the plurality of mobile devices.

2. The automatic pairing system of claim 1, wherein:
   the triggering mechanism comprises a near field communication (NFC) subsystem including an NFC tag secured to a vehicle component,
   the NFC tag is configured to communicate an identifying signal when initiated by an NFC receiver, and
   communication of the identifying signal triggers the vehicle initialization module.

3. The automatic pairing system of claim 2, wherein the NFC tag comprises a retrofit NFC tag.

4. The automatic pairing system of claim 1, wherein the triggering mechanism comprises:
   a pluggable cable configured to be connected to the vehicle; or
   a WiFi hotspot in the vehicle or mobile device.

5. The automatic pairing system of claim 1, wherein:
   the prioritization module is configured to limit communication with the vehicle to a single mobile device of the plurality of mobile devices.

6. The automatic pairing system of claim 5, wherein the prioritization module limits communication with the vehicle to one mobile device of the plurality of mobile devices that most recently paired with the vehicle or to one mobile device of the plurality of mobile devices that is nearest to a sensor.

7. An automatic pairing system comprising:
   a mobile device initialization module loaded onto a mobile device;
   a mobile device pairing module loaded onto the mobile device, the mobile device pairing module being configured to be launched by the mobile device initialization module and, after being launched, configured to automatically communicate mobile device pairing data stored on the mobile device pairing module to a vehicle to establish one or more communication channels of two or more communication types between the mobile device and the vehicle, the one or more communication channels include two or more or a combination of a data projection communication channel, a remote procedure call (RPC) communication channel, and a Bluetooth communication channel; and
   a triggering mechanism configured to trigger the mobile device initialization module to launch the mobile device pairing module,
   wherein:
      the one or more communication channels include a first pairing between the mobile device and the vehicle;
      a first communication channel of a first communication channel type is set between the vehicle and the mobile device while a second communication channel of a second communication channel type is set between the vehicle and another mobile device paired with the vehicle;
      the vehicle pairing module is configured to establish the one or more communication channels with no input from an operator following the triggering of the mobile device initialization module; and
      the vehicle pairing data includes one or more of identifying information for the vehicle, a password, a pairing sequence format, a protocol, a networking medium, and a number and a type of the one or more communication channels.

8. The automatic pairing system of claim 7, wherein the triggering mechanism comprises one or more of:
   a near field communication (NFC) subsystem including an NFC receiver included in the mobile device, the NFC receiver configured such that when the NFC receiver is positioned within a predefined distance of an NFC tag, the NFC receiver receives an identifying signal from the NFC tag that triggers the mobile device initialization module;

a pluggable cable configured to be connected to the mobile device; and a WiFi hotspot in the vehicle or mobile device.

9. The automatic pairing system of claim 7, wherein the mobile device further comprises an evaluation module configured to determine an optimal method of pairing between the mobile device and the vehicle.

10. A method of pairing a mobile device with a vehicle abstraction device, the vehicle abstraction device configured to interface with a vehicle, the method comprising:

triggering a mobile device initialization module loaded on the mobile device;

in response to triggering the mobile device initialization module, launching a mobile device pairing module;

automatically communicating mobile device pairing data stored on the mobile device pairing module with the vehicle;

establishing one or more communication channels of two or more communication types between the mobile device and the vehicle abstraction device based on the communicated mobile device pairing data, the one or more communication channels including two or more or a combination of a data projection communication channel, a remote procedure call (RPC) communication channel, and a Bluetooth communication channel;

setting a first communication channel of a first communication channel type between the vehicle abstraction device and the mobile device; and setting a second communication channel of a second communication type between the vehicle abstraction device and another mobile device paired with the vehicle abstraction device, wherein the pairing of the mobile device with the vehicle abstraction device includes a first pairing between the mobile device and the vehicle abstraction device, and wherein the establishing the at least one communication channels occurs with no input from an operator following the triggering of the mobile device initialization module.

11. The method of claim 10, wherein the triggering the mobile device initialization module comprises:

generating a radio frequency field to power a near field communication (NFC) tag secured to a vehicle component; and receiving an identifying signal from the NFC tag.

12. The method of claim 10, further comprising determining an optimal method of pairing between the mobile device and the vehicle.

13. The method of claim 10, wherein triggering the mobile device initialization module comprises connecting a pluggable cable between the mobile device and the vehicle.

14. The method of claim 10, wherein the mobile device is one of a plurality of mobile devices paired with the vehicle abstraction device, the method further comprising limiting communication to communication between the vehicle abstraction device and one of the plurality of mobile devices.

15. The method of claim 14, wherein limiting communication comprises:

evaluating which of the plurality of mobile devices paired most recently with the vehicle abstraction device; and allowing communication between the vehicle abstraction device and the one mobile device of the plurality of mobile devices that most recently paired with the vehicle abstraction device.

16. The method of claim 10, wherein the mobile device pairing data includes identifying information for the mobile device, a password, a pairing sequence format, a protocol, a networking medium, and number and type of the at least one communication channels.

17. The automatic pairing system of claim 1, wherein:

the one or more communication channels include a first pairing between each of the plurality of mobile devices and the vehicle;

the vehicle pairing module is configured to establish the one or more communication channels with no input from operators following the triggering of the vehicle initialization module; and the vehicle pairing data includes one or more or a combination of identifying information for the vehicle, a password, a pairing sequence format, a protocol, a networking medium, and a number and a type of the one or more communication channels.

* * * * *